UNITED STATES PATENT OFFICE.

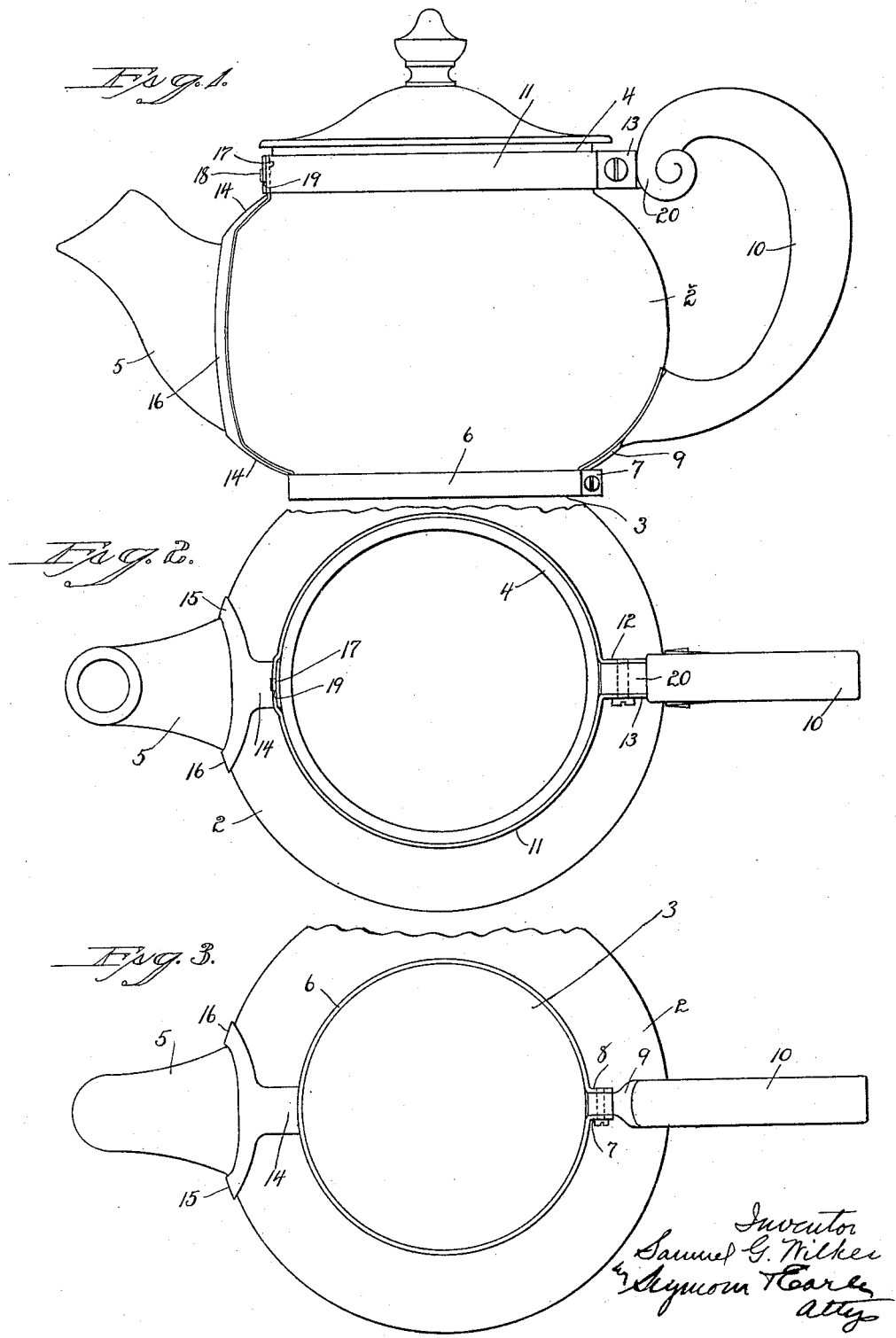

SAMUEL G. WILKES, OF WALLINGFORD, CONNECTICUT, ASSIGNOR TO R. WALLACE & SONS MFG. CO., OF WALLINGFORD, CONNECTICUT, A CORPORATION.

HANDLE FOR TEA AND COFFEE POTS.

1,162,426.

Specification of Letters Patent.

Patented Nov. 30, 1915.

Application filed March 27, 1915. Serial No. 17,478.

*To all whom it may concern:*

Be it known that I, SAMUEL G. WILKES, a citizen of the United States, residing at Wallingford, in the county of New Haven and State of Connecticut, have invented a new and useful Improvement in Handles for Tea and Coffee Pots; and I do hereby declare the following, when taken in connection with the accompanying drawings and the characters of reference marked thereon, to be a full, clear, and exact description of the same, and which said drawings constitute part of this application, and represent, in—

Figure 1 a side view of a vessel having a handle connected thereto in accordance with my invention. Fig. 2 a top or plan view of the same with the cover removed. Fig. 3 an underside view.

This invention relates to an improvement in tea and coffee pots and similar vessels such as are usually constructed from vitrified plastic material as distinguished from metal. In connecting the handles to such vessels, a neck-band and a foot-band are provided between the ends of which the handles are riveted or otherwise attached. In use, however, these bands sometimes become separated from the vessel, and thus the handle becomes detached.

The object of this invention is to provide means for more firmly securing the foot and neck-bands, and especially in vessels having a spout; and the invention consists in the construction hereinafter described and particularly recited in the claim.

In carrying out my invention I have shown it in connection with a pot 2 of any suitable design having the usual foot 3, neck 4 and spout 5. Around the foot 3 is a foot-band 6, the ends 7 and 8 of which are turned outward to form a bearing for the lower end 9 of the handle 10, this end 9 being secured between the ends 7 and 8. Around the neck 4 is a neck band 11 the ends 12 and 13 of which are turned outward to receive between them the upper end 20 of the handle 10 which is connected to the ends by a screw or otherwise. Secured to the foot-band 6 in any preferred manner, but preferably permanently secured thereto, is a yoke 14, the sides 15 and 16 of which surround the spout 5, and the upper end 17 is detachably connected with the neck-band 11. This connection may be made in a variety of ways. As herein shown the upper end 17 of the yoke is provided with a stud 18 which passes through a perforation 19 formed for it in the neck band 11, and so that when the neck-band engages with the upper end of the yoke and the handle is coupled with the ends of the bands, the bands are firmly locked upon the vessel.

I claim:—

The combination with a vessel having a spout, a foot and a neck, of bands surrounding said foot and neck, a handle connected with the ends of the said bands, and a yoke permanently connected with one band and detachably connected with the other band, said yoke formed with an opening through which said spout projects.

In testimony whereof, I have signed this specification in the presence of two subscribing witnesses.

SAMUEL G. WILKES.

Witnesses:
B. W. TOWNSEND,
R. C. WILLIAMS.

Copies of this patent may be obtained for five cents each, by addressing the "Commissioner of Patents, Washington, D. C."